United States Patent [19]

Krishnakumar et al.

[11] 4,426,202
[45] Jan. 17, 1984

[54] PALLET LOAD SUPPORT

[75] Inventors: Suppayan M. Krishnakumar, Nashua, N.H.; John F. E. Pocock, Stone Mountain, Ga.; Ieuan L. Harry, Nashua, N.H.

[73] Assignee: The Continental Group, Inc., Stamford, Conn.

[21] Appl. No.: 364,698

[22] Filed: Apr. 2, 1982

[51] Int. Cl.³ ............................................. B29C 17/07
[52] U.S. Cl. .................................. 425/534; 264/523; 425/538
[58] Field of Search .................. 425/526, 534, 538; 264/523, 535

[56] References Cited

U.S. PATENT DOCUMENTS

| | | | |
|---|---|---|---|
| 3,339,230 | 9/1967 | Farrell | 425/526 |
| 4,140,464 | 2/1979 | Spurr et al. | 425/534 X |
| 4,197,073 | 4/1980 | Rees et al. | 425/534 X |
| 4,354,813 | 10/1982 | Collombin | 425/534 X |
| 4,362,498 | 12/1982 | Harry et al. | 425/526 |
| 4,365,950 | 12/1982 | Harry et al. | 425/535 X |

*Primary Examiner*—Jan H. Silbaugh
*Attorney, Agent, or Firm*—Charles E. Brown

[57] ABSTRACT

This relates to a blow molding apparatus wherein plural preforms are directed to plural cavity blow molds by way of a pallet which supports the preforms by neck portions thereof. The pallets are positioned relative to blow molds of a set by way of a track. The track is transversely shiftable to present preforms transversely of the blow mold halves prior to the closing of the blow molds and there is associated with supports for the track wedge members which automatically lower the track relative to the blow molds more closely to position a supporting flange of each preform with respect to the upper surface of the blow molds. The track is finally further moved downwardly to engage the support flanges of the preforms with the top surfaces of the blow molds under controlled pressure conditions by means of fluid cylinders. This abstract forms no part of the specification of this application and is not to be construed as limiting the claims of the application.

15 Claims, 8 Drawing Figures

PALLET LOAD SUPPORT

This invention relates in general to new and useful improvements in blow molding machines, and more particularly to a blow molding machine wherein preforms are directed to a plurality of split blow molds by way of a pallet which is moved along a predetermined path defined by a track.

It is to be understood that the preforms are carried in individual collets carried by a pallet and that the preforms have a snap-in resilient fit within the collets. It is also to be understood that the preforms have supporting flanges which, during the blow molding operation, rest upon the molds and serve to support the preforms against movement into the interior of the molds under the influence of stretch rods and internal gaseous pressure. It is further to be understood that the preforms can now be supplied to the molds with the supporting flanges thereof in the necessary position for contact with the tops of the molds.

It is to be understood that if the preforms are presented to the molds in vertically spaced relation thereto and the preforms are not moved down into the molds to seat the supporting flanges thereof on the molds, when the preforms are operated on in the blow molding process, either the preforms will snap out of the collets or will place an undue load on supporting rollers for the pallets. Accordingly, in accordance with this invention, there are provided means for moving the track downwardly toward the blow molds so as to seat the supporting flanges of the preforms on the blow molds.

In accordance with this invention, when there is a relative shifting of the preforms and thus the track and pallet with respect to first halves of the blow molds, cooperating wedge elements wll be actuated to move the track down toward the blow molds and position the supporting flanges of the preforms just above or perhaps even in light touching engagement with the tops of the first mold halves. Thereafter, when the molds are closed, the track is further moved down under the influence of a fluid motor to apply the supporting flanges of the preforms in pressure contact with the tops of the blow molds.

There are also provided means associated with the mechanism for shifting the track and pallet relative to the first mold half for automatically longitudinally aligning the pallet and preforms carried thereby with the blow molds.

With the above and other objects in view that will hereinafter appear, the nature of the invention will be more clearly understood by reference to the following detailed description, the appended claims, and the several views illustrated in the accompanying drawings.

IN THE DRAWINGS

Figure 7:
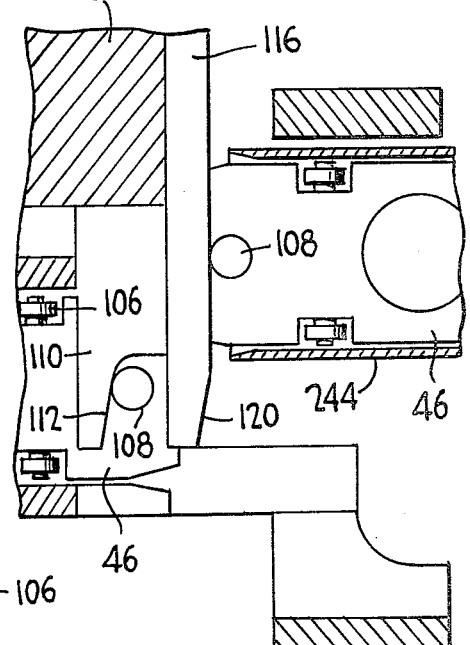
FIG. 7 is a view similar to FIG. 6 of the other end of the pallet, showing the pallet in a mold closed position relative to a discharged pallet.
Figure 8:
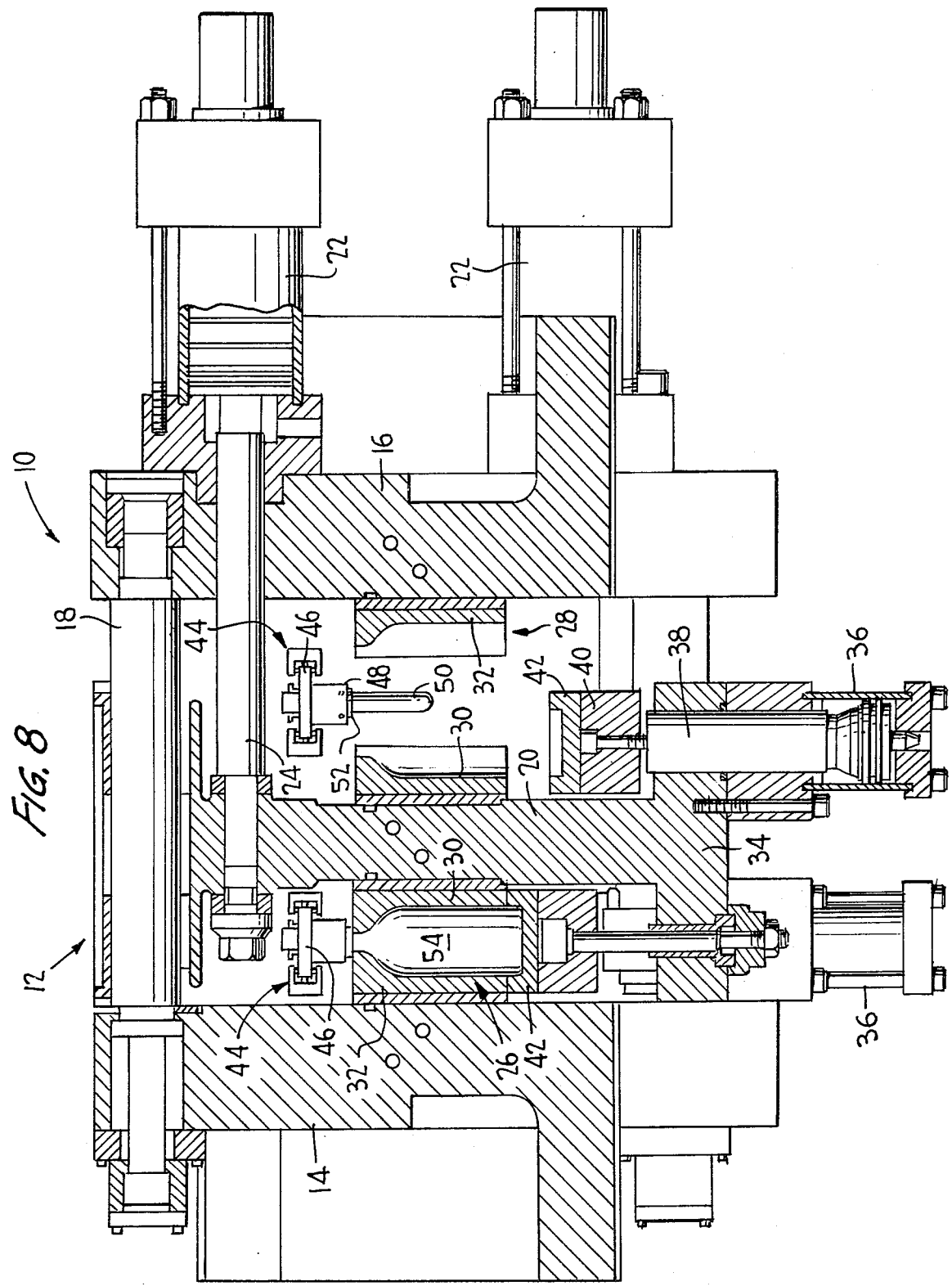
FIG. 8 is a vertical sectional view on a reduced scale taken transversely of the blow molding machine, and shows the general arrangement of the molds and the mounting of the supports for the molds to effect an automatic opening of one mold set in response to closing of the other mold set.

Reference is first made to FIG. 7 which illustrates the general environment of this invention. This invention relates to a blow molding machine generally identified by the numeral 10 and including a double acting clamp generally identified by the numeral 12. In simplest terms, the clamp 12 includes first platens 14, 16 which are tied together by tie rods 18 which also function as supports for a centrally located movable clamp member 20. Four extensible fluid motors or cylinders 22 are carried by the fixed platen 16 and piston rods 24 thereof are connected to the clamp 20 for first positioning the clamp 20 in cooperating relation with respect to the platen 14 and then in cooperating relation with respect to the platen 16.

The clamp assembly 12 is provided with two sets of blow molds with one set of blow molds being closed and the other set of blow molds being simultaneously opened. Each set of blow molds will include a plurality of longitudinally adjacent cavities. For descriptive purposes, between the platen 14 and the clamp 20 there is a blow mold set 26 and between the platen 16 and the clamp 20 there is a blow mold set 28. Each of the blow mold sets 26, 28 is of a three-piece construction and, because of the lengths of the blow mold sets, they may also be divided into two longitudinal halves. For example, each longitudinal half may carry twelve cavities.

Each of the blow mold sets 26, 28 includes a first half 30 mounted on the clamp 20 for movement therewith and a second half 32 which is fixed and is mounted on its respective fixed pallet 14 or 16. The clamp 20 is generally I-shaped in cross section and includes a lower flange 34. The lower flange 34 is provided with longitudinally spaced cylinders or extensible fluid motors 36 having piston rods 38 which are secured to the undersides of bars 40 which, in turn, support mold bottoms 42.

In accordance with this invention, there is positioned above the center point of each of the mold sets 26, 28 a longitudinal track 44 which is shaped to receive a longitudinally moving pallet 46. The pallet 46 carries for relative rotation therewith a plurality of collets 48 which extend therethrough. Each of the collets 48 will have resiliently retained in the lower part thereof an upper neck finish of a preform 50 with a supporting flange 52 of such preform being held tightly against the underside of the respective collet 48.

With respect to the mold set 28, it is to be understood that when the preforms 50 are positioned therein, the track 44 is first shifted to the left to present the preforms 50 transversely into the first mold half 30. Then the clamp 20 is actuated to move the first mold halves 30 together with the preforms 50, the pallet 46 and the track 44 to the right until the first mold halves 30 are closed relative to the second mold halves 32. Then the mold bottoms 42 are moved upwardly after which the preforms 50 are blow molded into bottles 54 as shown with respect to the mold set 26. It will be seen that when the clamp 20 moves to the right, the first mold halves 30 move away from the second mold halves 32 carried by the platen 14 to open the molds. Even before this occurs, the mold bottoms 42 of the mold set 26 are being moved downwardly to their out-of-the-way positions. As the first mold halves 30 of the mold set 26 move together with the clamp 20 toward their open positions, the track 44 associated with the mold set 26 is also moved by the clamp 20 to a centered position whereat, when the associated pallet 46 is discharged from the track 44, there will be clearance for the bottles 54 to move between the mold halves 30, 32 to be discharged.

In accordance with this invention, each track 44 is carried by a pair of support members 60 which extend between a pair of support brackets 62. Each support bracket 62 is, in turn, supported by a carrier 64 which is mounted on a combined support and guide rod 66 which extends between the fixed platens 14 and 16 as is generally shown in FIGS. 1 and 4.

Figure 1:
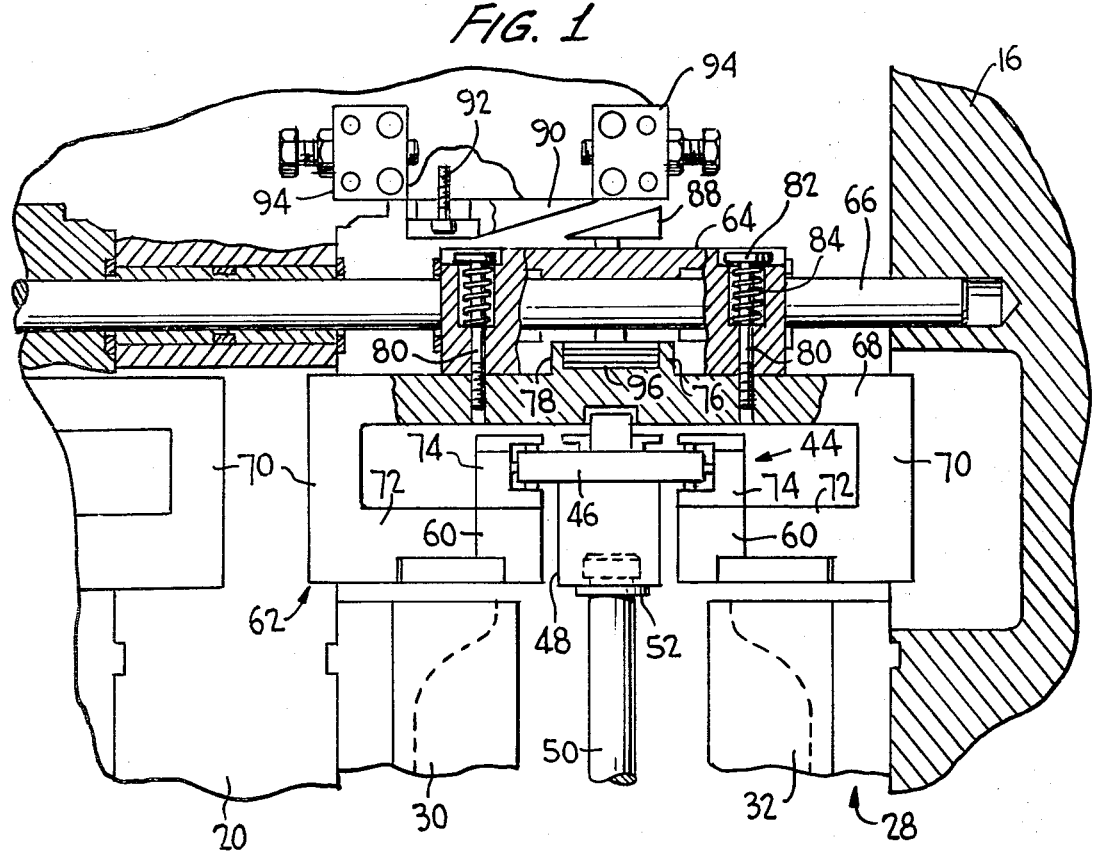
FIG. 1 is a transverse sectional view taken through one half of a blow molding machine in accordance with this invention, and shows preforms presented between blow mold halves which are in their open state.

Referring particularly to FIG. 1, it will be seen that the mounting bracket 62 includes an upper part 68 which has depending therefrom a pair of side parts 70 which, in turn, each includes a lower part 72 with the lower parts being in spaced relation to one another so as to permit the passage of collets 48 depending from each pallet 46 free to pass therebetween. It will be noted that the support members 60 are at the inner ends of the lower parts 72 and actually define the spacing between which the collets 48 pass. It is also to be noted that the track 44 includes a pair of generally opposed rails or track members 74 which directly overlie and are supported by the support members 60.

The mounting brackets 68 are each carried by the associated support member 64 for limited vertical movement and are interlocked with the underside of the supports 64 by way of an upward projection 76 on the upper member 68 which projects into a like recess 78 in the underside of the support 64. Further, each mounting bracket 68 is suspended from its support 64 by means of four bolts 80 which freely pass through the support 64 and are threaded into the upper part 68. Each bolt 80 has an enlarged head 82, and bearing against the underside of each head 82 and seated on the support 64 is a compression spring 84 which constantly resiliently urges the upper part 68 against the underside of the support 64.

Figure 4:
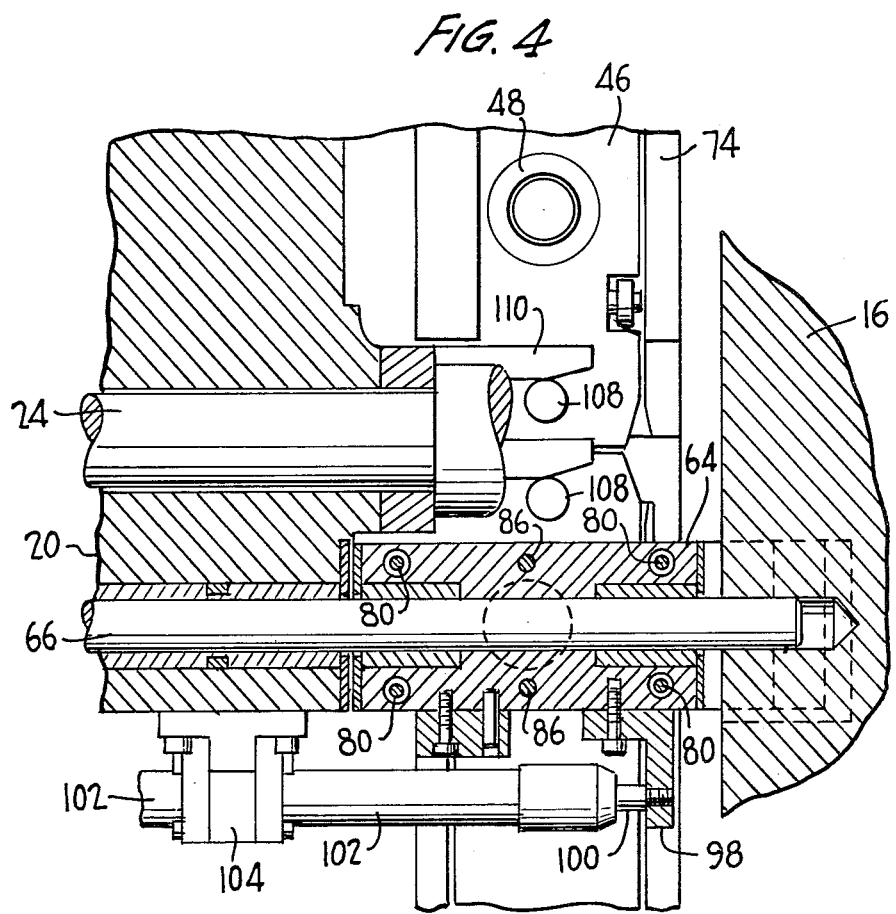
FIG. 4 is a slightly enlarged horizontal sectional view taken generally along the line 4—4 of FIG. 3, and shows a general mounting of a support for the track for effecting transverse movement of the track.
Figure 5:
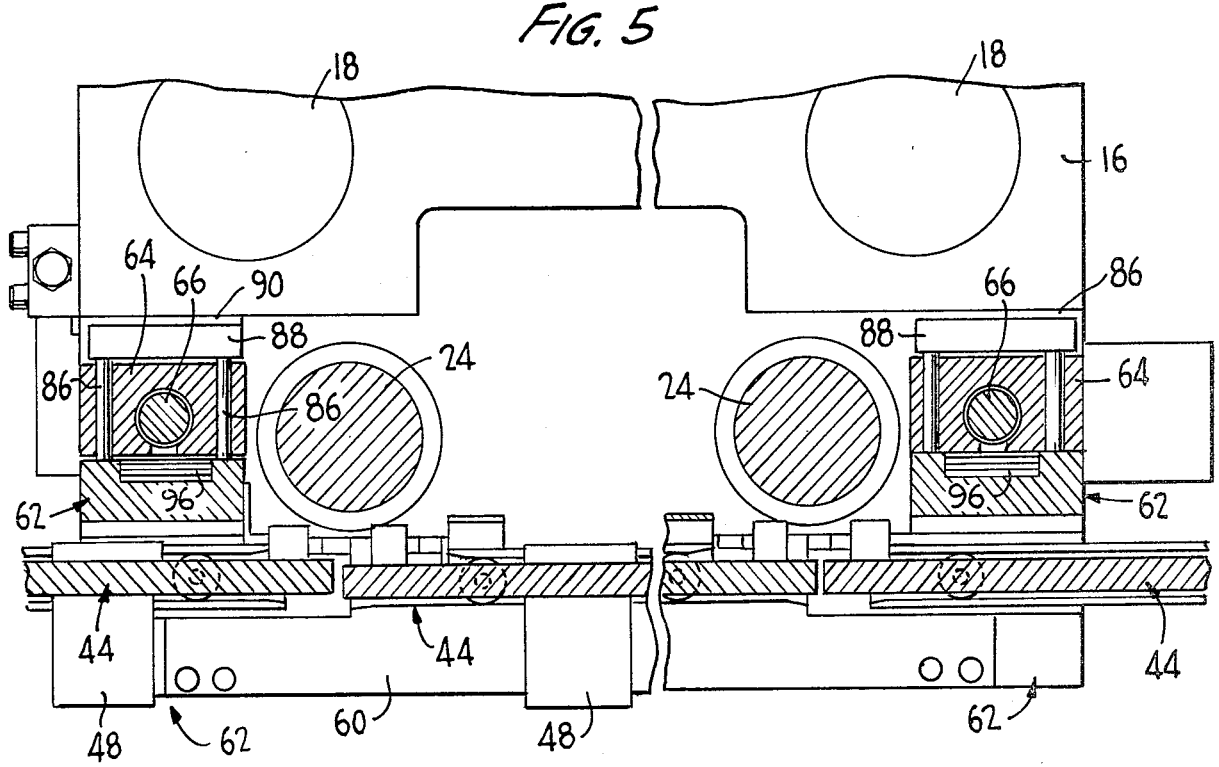
FIG. 5 is another slightly enlarged vertical sectional view taken longitudinally of the pallet with the intermediate portions broken away, and shows further the mounting of the support for the track.

With particular reference to FIG. 4, it will be seen that the support 64 has extending therethrough for free movement a pair of rods 86 which are connected to the upper part 68 of the mounting bracket 62. These rods carry on their opposite upper ends a relatively wide wedge member 88 which is also illustrated in FIG. 5.

Returning once again to FIG. 1, it will be seen that the upper part of the clamp 20 has depending therefrom a wedge 90 which is positioned for cooperation with the wedge 88. The wedge 90 is secured to the upper part of the clamp 20 by suitable fastening means 92. It is also to be noted that the upper part of the clamp member 20 carries a pair of adjustable stop members 94 which engage fixed parts of the molding machine to limit the stroke of the clamp 20.

It is further to be noted that the projection 76 has formed therein a fluid motor 96 which bears against the underside of the support 64 and may, when actuated, urge the mounting bracket 62 downwardly with respect to the support 64.

At this time reference is made to FIG. 4 wherein it will be seen that each support 64 carries an angle bracket 98 which, in turn, is connected to a piston rod 100 of a double acting fluid cylinder 102 which is carried by a mounting bracket 104 secured to the clamp 20.

Figure 6:
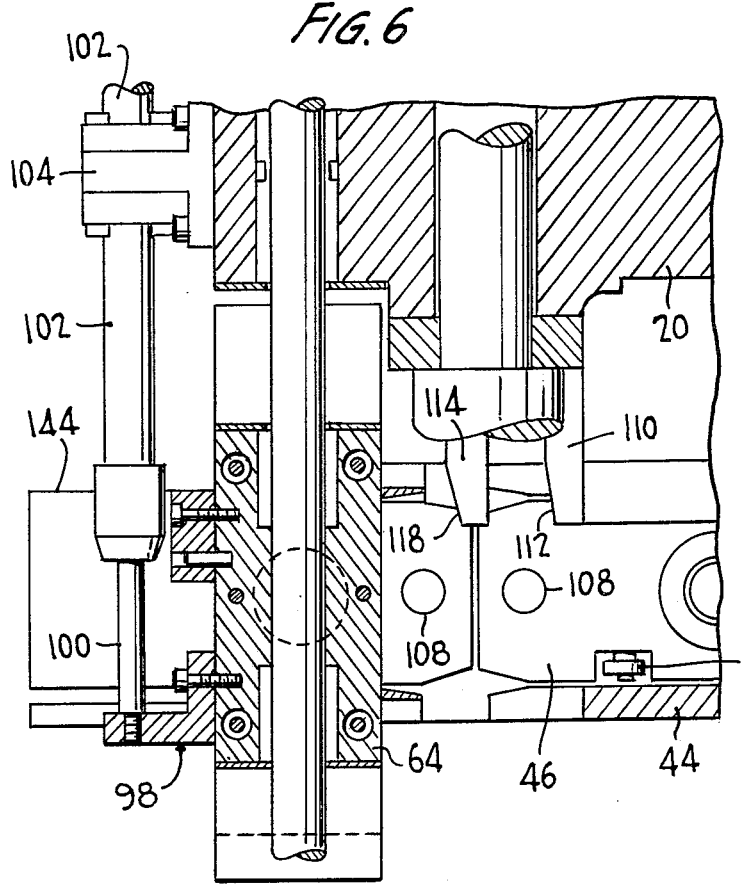
FIG. 6 is another horizontal sectional view on a slightly larger scale corresponding generally to FIG. 4, but prior to the pallet shifting.

Referring now to FIG. 6, it will be seen that the pallet 46 is provided along opposite sides thereof with small support wheels or rollers 106. These support wheels or rollers support the pallet 46 within the tracks including the track 44. Further, each pallet 46 is provided at its opposite ends with upstanding pins 108 which may be in the form of cam followers. These pins 108 are engaged by transport mechanisms on opposite sides of the clamp assembly 12 in a manner which in no way forms a part of this invention. However, the pallets 46 which are within the clamp assembly are pushed into the clamp assembly and pushed out of the clamp assembly by following pallets. Therefore, while the general accuracy of positioning of the pallets within the clamp assembly is assured, it is necessary that each pallet 46 be accurately longitudinally aligned with the mold cavities so that the preforms carried by the pallets will be accurately centered in the mold cavities. To this end, the clamp 20 is provided with a pair of guide members 110 which have openings therein for receiving the pins 108 and each opening includes a cam surface 12 for engagement by the pins 108. The cam surfaces 112 face in opposite directions so as to assure the accurate centering of a pallet 46 with respect thereto and with respect to the blow molds of the respective blow mold set when the pallets or tracks are transversely shifted, as has been previously described.

Figure 2:
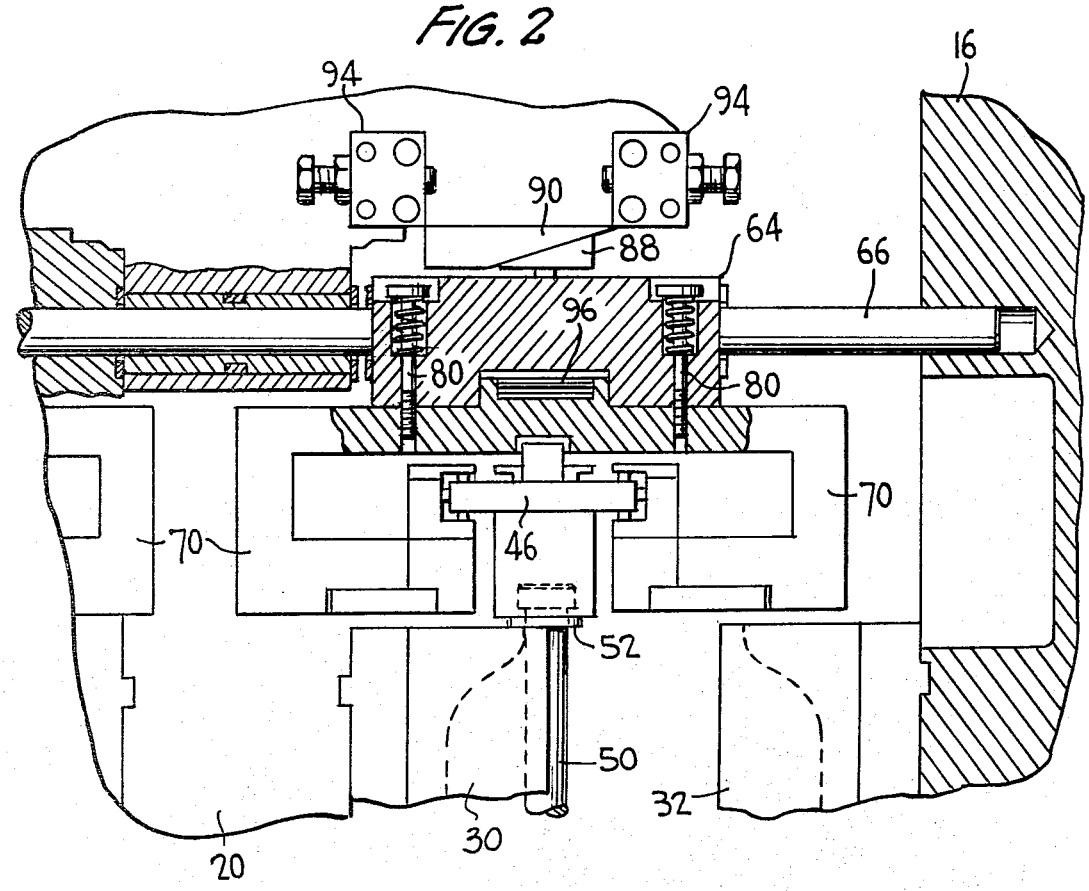
FIG. 2 is a fragmentary vertical sectional view similar to FIG. 1, and shows relative shifting between first blow mold halves and the preforms transversely to seat the preforms in the first mold halves and with the track and thus the preforms being moved downwardly by wedge means.

As previously mentioned, each track 44 is centered with respect to its associated blow mold set when a pallet 46 enters into the clamp assembly 12 supported by that track. With reference to FIG. 1, it will be seen that with the mold halves 30, 32 open, the pallet 46 is moved into the clamp assembly 12 to present preforms 50 carried thereby between the mold halves 30, 32 in centered relation. The fluid cylinders 102 at the opposite ends of the track 44 are then actuated to move the supports 64 to the left, as viewed in FIG. 1, simultaneously to center the pallet 46 relative to the blow molds of the set 28 and transversely to set the preforms 50 in the mold halves 30, as shown in FIG. 2. It will be seen that as the supports 64 move to the left, the wedge members 88 carried thereby will engage the wedge members 90 and urge the mounting brackets 68 downwardly slightly with respect to the support 64. Thus, while the supporting flanges 52 of the preforms are initially spaced above the tops of the molds as shown in FIG. 1 to facilitate the entrance of the preforms 50 into the blow molds, the support flanges 52 are now moved downwardly so that they substantially touch the tops of the mold halves 30 as shown in FIG. 2.

Figure 3:
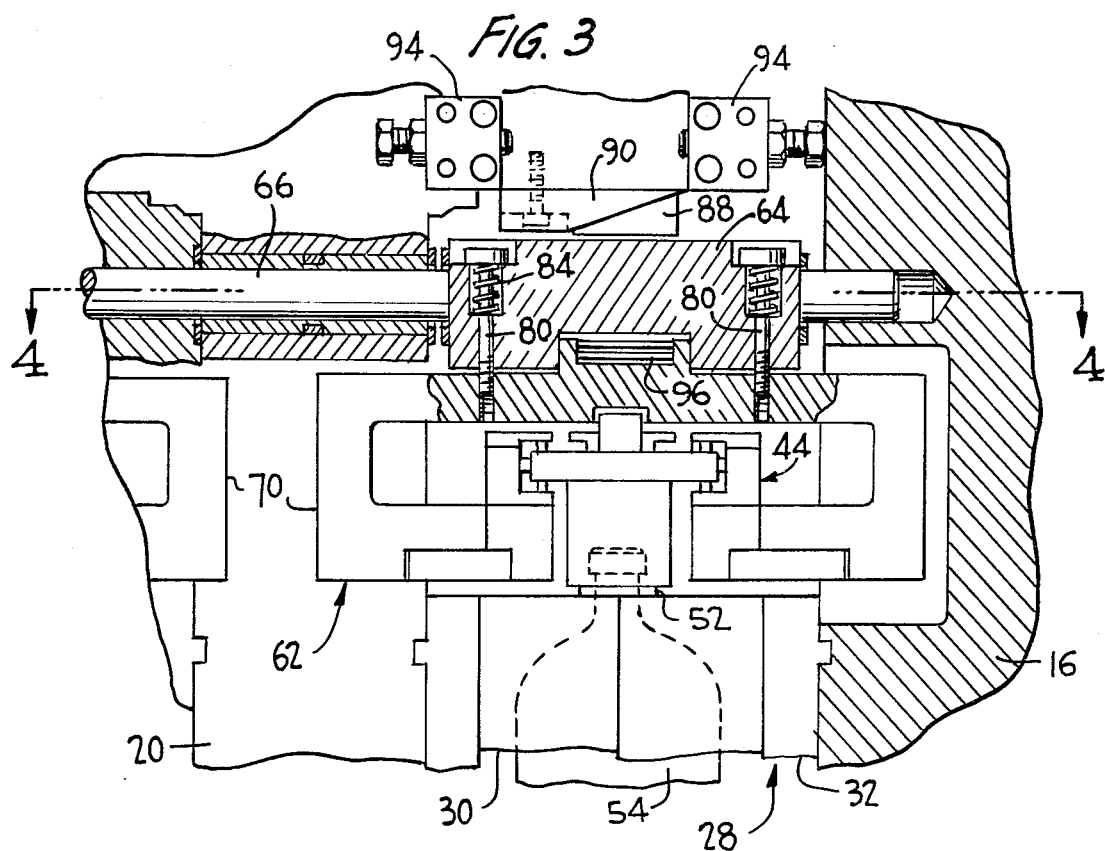
FIG. 3 is another fragmentary vertical sectional view similar to FIG. 1, and shows the blow molds closed and the track and preforms carried by a pallet further moved downwardly to provide pressure engagement between supporting flanges of the preforms and the tops of the molds.

In the next step of operation, the clamp 20 is moved to the right so as to move the mold halves 30, the supports 64, the track 44, the pallet 46 and the preforms 50 as a unit. The net result is that the blow molds of the set 28 are closed as shown in FIG. 3. At this time the fluid motors 96 are actuated further to move the mounting brackets 62 down relative to the mold set 28 and to seat the support flanges 52 of the preforms on the tops of the molds of the set 28 at a predetermined pressure.

The preforms 50 are then blow molded in accordance with the configurations of the blow molds. In the illustrated form of the invention the blow molded articles are bottles 54.

When the blow molding operation has been completed, the pressure on the fluid motors 96 is released and the mounting brackets 62 are pulled upwardly by the compression springs 84 again to engage the wedge members 88, 90. When the mold set 28 is opened, the wedge members 88, 90 are disengaged and the fluid cylinder 102 is actuated so as to move the supports 64 back to their centered positions of FIG. 1.

As pointed out above, in the operation of the clamp assembly 10 the pallet 44 newly introduced into the clamp assembly is first shifted transversely relative to the clamp 20 to engage the guide members 110 carried by the clamp 20 so as to align the pallet 46 with the mold cavities. Then, after the preforms have been seated in the cavities of the mold halves 30, the clamp 20 and the mold halves 30 are moved to the right, as viewed in FIG. 2, with the result that the guides 110 together with associated guide member 114, 116 having cam surfaces 118, 120, respectively, also move to the right both relative to the mold halves 32 and the platen 16 and also with respect to a next following pallet 46 and a previously discharged pallet 46. The net result will be that the cam surface 118 will engage the forward pin 108 of the next following pallet 46 and make certain that it has not transferred from its track segment 144 onto the track segment 44. In a like manner the cam surface 120 will engage the trailing pin 108 of the departing pallet 46 and make certain that it has advanced sufficiently forward so as to be entirely carried by its associated track segment 244. While only FIG. 7 shows the function of the guide member 116, it is believed that the function of the guide member 114 may be readily visualized from the illustration of FIG. 6.

Although only a preferred embodiment of the track support and shifting means in combination with the specific blow molding apparatus has been specifically illustrated and described herein, it is to be understood that minor variations may be made in the manner of supporting the track and the positioning of the preforms carried thereby with respect to blow molds without departing from the spirit and scope of the invention as defined by the appended claims.

We claim:

1. In a blow molding machine wherein a plurality of preforms are simultaneously presented to a like number of split blow molds, and wherein the preforms are carried by a pallet movable along a track supported by rollers, said pallet forming means for retaining and carrying preforms to, while in, and from said blow molds without separation of the preforms from said pallet in terms of carrying function, said pallet forming means for supporting preforms when carried to and from said blow molds, and an apparatus for automatically transferring the support of the preforms from said pallet to said blow molds while the preforms are still carried by said pallet.

2. In a blow molding machine wherein a plurality of preforms are simultaneously presented to a like number of split blow molds, and wherein the preforms are carried by a pallet movable along a track supported by rollers, an apparatus for automatically transferring the support of the preforms from said pallet to said blow molds, said track being mounted above said blow molds a distance to initially position supporting flanges of preforms slightly above said blow molds, and said apparatus comprising means mounting said track for movement toward said blow molds to seat the supporting flanges of preforms carried by said pallet on said blow molds with such preforms being supported on said blow molds generally independently of said pallet.

3. A blow molding machine according to claim 2 wherein said apparatus includes means for shifting said track toward said blow mold.

4. A blow molding machine according to claim 2 wherein said apparatus includes means for shifting said track toward said blow mold in response to transverse relative movement between first halves of said molds and said track to seat preforms in sid first mold halves.

5. A blow molding machine according to claim 4 wherein said means for shifting said track includes co-operating wedge means connected to said first mold halves and to said track.

6. A blow molding machine according to claim 3 wherein said means for shifting said track includes co-operating wedge means connected to said first mold halves and to said track.

7. A blow molding machine according to claim 5 together with fluid motor means for further shifting said track toward said molds to effect controlled pressure engagement of preform support flanges on said blow molds.

8. A blow molding machine according to claim 4 together with fluid motor means for further shifting said track toward said molds to effect controlled pressure engagement of preform support flanges on said blow molds.

9. A blow molding machine according to claim 3 together with fluid motor means for further shifting said track toward said molds to effect controlled pressure engagement of preform support flanges on said blow molds.

10. A blow molding machine according to claim 5 wherein said means for effecting relative movement between said mold first halves and said track includes means for shifting said track toward said mold first halves.

11. A blow molding machine according to claim 4 wherein said means for effecting relative movement between said mold first halves and said track includes means for shifting said track toward said mold first halves.

12. A blow molding machine according to claim 5 wherein said means for effecting relative movement between said mold first halves and said track includes means for shifting said track toward said mold first halves, and means for shifting said mold first halves and said track toward second halves of said molds.

13. A blow molding machine according to claim 4 wherein said means for effecting relative movement between said mold first halves and said track includes means for shifting said track toward said mold first halves, and means for shifting said mold first halves and said track toward second halves of said molds.

14. A blow molding machine according to claim 4 wherein there are means for automatically longitudinally aligning said pallet with said blow molds in response to said relative movement.

15. A blow molding machine according to claim 11 wherein there are means for automatically longitudinally aligning said pallet with said blow molds in response to said shifting of said track.

* * * * *